INVENTOR.
JOSEPH P. WAGNER

HIS ATTORNEYS

April 22, 1969 J. P. WAGNER 3,439,693
CONTROLLING SYSTEM WITH SAFETY RELAY
AND CONTROLLING AND INDICATING UNITS
Filed Feb. 8, 1967 Sheet 2 of 4

INVENTOR.
JOSEPH P. WAGNER
BY Bandr & Candr
HIS ATTORNEYS

April 22, 1969 J. P. WAGNER 3,439,693
CONTROLLING SYSTEM WITH SAFETY RELAY
AND CONTROLLING AND INDICATING UNITS
Filed Feb. 8, 1967 Sheet 4 of 4

TO TRANSMITTER 50

INVENTOR.
JOSEPH P. WAGNER
BY
HIS ATTORNEYS

United States Patent Office 3,439,693
Patented Apr. 22, 1969

3,439,693
CONTROLLING SYSTEM WITH SAFETY RELAY AND CONTROLLING AND INDICATING UNITS
Joseph P. Wagner, Knoxville, Tenn., assignor to Robertshaw Controls Company, Richmond, Va., a corporation of Delaware
Filed Feb. 8, 1967, Ser. No. 614,590
Int. Cl. F01b 25/12, 25/16, 27/00
U.S. Cl. 137—26                                    21 Claims

ABSTRACT OF THE DISCLOSURE

A control system including a manually operable safety relay and a plurality of controlling and indicating units. The relay is connected immediately to one or more immediately effective controlling and indicating units and is connected with delay means to delay one or more delay type controlling and indicating units.

The immediately effecive units can stop or otherwise control an engine or the like in response to unsafe conditions, whereas the delay units can stop the engine or the like in response to unsafe conditions only after a delay permitting a short starting operation of the engine or the like.

The relay has a pressure responsive holding action after it is actuated that is released by any of the units in response to unsafe conditions.

Background of the invention

This invention is directed to a control system for controlling the operation of a controlled device, such as an engine, with the use of pressure fluid, such as compressed air.

A manually operable safety relay is supplied with compressed air and distributes it to a plurality of controlling and indicating units, to a controlled device, such as the fuel valve of an engine, and to a delay means. The delay means delays the effectiveness of the engine stopping power of one or more of the units until the engine has attained a complete starting operation. One or more of the units are immediately effective to stop the engine without such delay.

The controlling and indicating units have built in indicator means to hold the respective indicators of such units in the indicating positions which they have at the time when the engine is stopped by one or more of such units so the cause of stoppage is indicated to the operator by the unsafe indication.

The relay has a fluid pressure responsive self holding action after it has been actuated. Any of the units can release such holding action in response to any of the unsafe or undesirable conditions to which the units are respectively responsive.

Pressure fluid control systems have been used to control the operation of a controlled device, such as an engine. Examples of such prior systems are disclosed in United States patents to L. M. Puster, No. 3,254,670, patented June 7, 1966, and to L. M. Puster, No. 3,216,409, patented Nov. 9, 1965.

However, the system and the main components of this invention are different in construction and operation from the systems and main components disclosed in the above patents, as more fully set forth in the drawings and in the following description and claimed subject matter.

Applicant's relay with its fluid operated actuator and with its fluid operated holding means, the capacitor delay means, the delay control manifold, and the detent operated controlling and indicating units are individually different and cooperate in a different manner in applicant's system from the patent components and patent systems.

Summary of the invention

This invention is therefore directed to a novel system of controlling a controlled device, such as an engine, by a new manually actuatable safety relay, a plurality of controlling and indicating units with delay means for some of such units. The relay has a fluid pressure responsive holding action. The units indicate the cause of stoppage of the engine.

Description of the preferred embodiments

Certain words may be used in the specification and claimed subject matter of this application which indicate direction, relative position, and the like. Such words are used for the sake of clearness and brevity. However, it is to be understood that such words are used only in connection with the illustrations in the drawings, and that in actual use the parts described by such words may have entirely different directions, relative positions and the like. Examples of such words are "vertical," "horizontal," "upper," "lower," etc.

Figure 1:
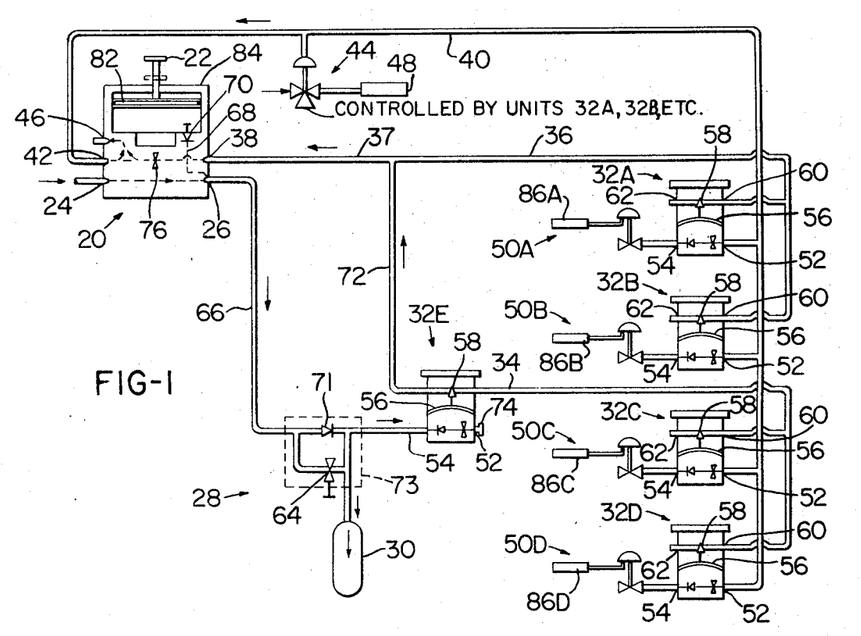
FIGURE 1 is a diagrammatic chart of a system embodying features of this invention, with the parts ready for the operator to start operation of the system.
Figures 7, 9, 10:
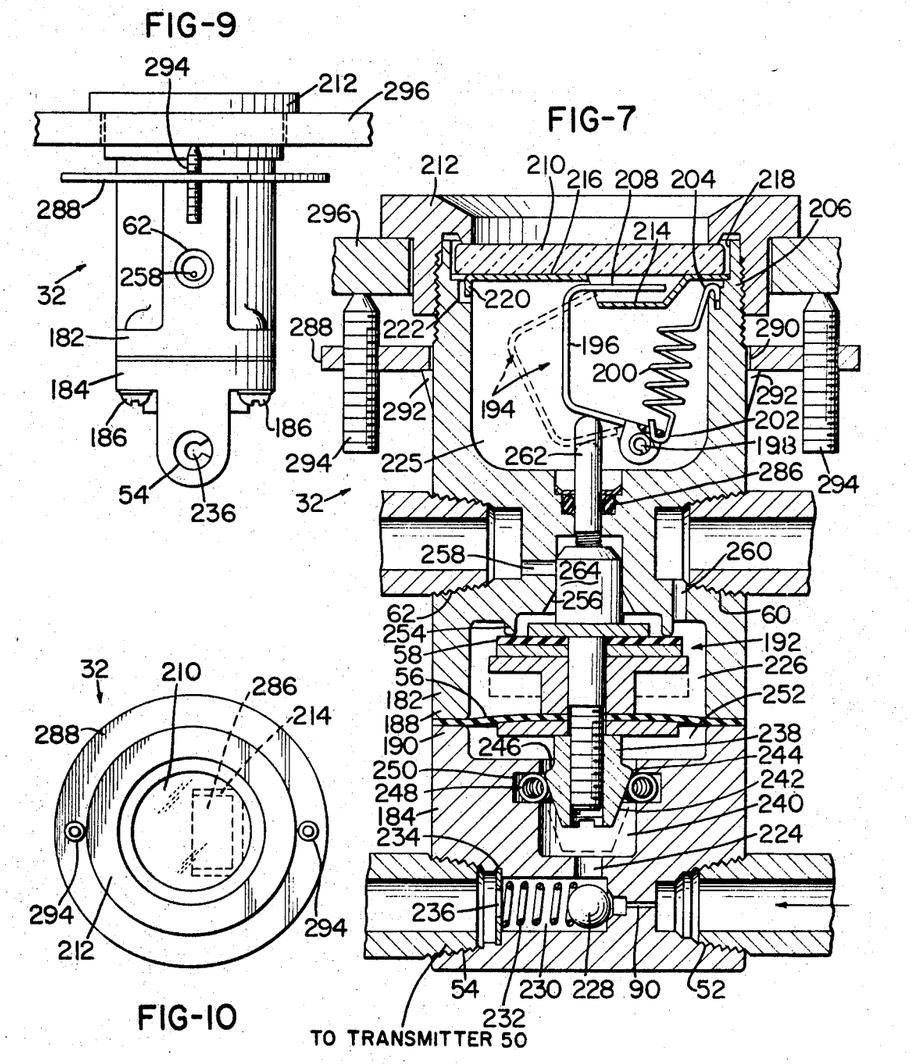
FIGURE 7 is a digrammatic vertical cross section of one of the controlling and starting units of the system in unvented condition.
FIGURE 9 is a reduced scale elevation of the left side of FIGURE 7.
FIGURE 10 is a top view of a portion of FIGURE 9.

In a control system as shown in FIGURE 1, a safety relay 20 is ready to have its actuator or knob 22 pushed down to start operation of the system. The relay pressure supply port 24 has been connected to a source of pressure fluid, such as compressed air. Such compressed air has passed through a delay pressure supply port 26 and into a delay means 28 which includes a delay pressure capacitor or volume tank 30 into which a proper volume of compressed air has entered after passing through the check valve 71. This compressed air has also entered a delay controlling and indicating unit 32E which disconnects the delayed control manifold 34 from the relay holding pressure port 38 to which it is connected by common connector 37. The immediate control manifold 36 is also connected to the relay holding pressure port 38 by the common connector 37. The unit 32E is in the condition of unit 32, as shown in FIGURE 7, modified by the addition of plug 74, as elsewhere more fully described.

A controlled pressure supply manifold 40 is connected to a relay controlled pressure supply port 42. This manifold 40 is also connected to the pressure controlled device 44, which may be a fuel control valve for an internal combustion engine 48 or the like.

In the condition of FIGURE 1, the manifolds 36 and 40 and the ports 38 and 42 are connected to the relay vent port 46 by the construction of the relay 20, so that the controlled device or fuel valve 44 is depressurized and vented at port 46 and does not supply fuel to the engine 48, which therefore cannot be operated.

Figures 2, 3:
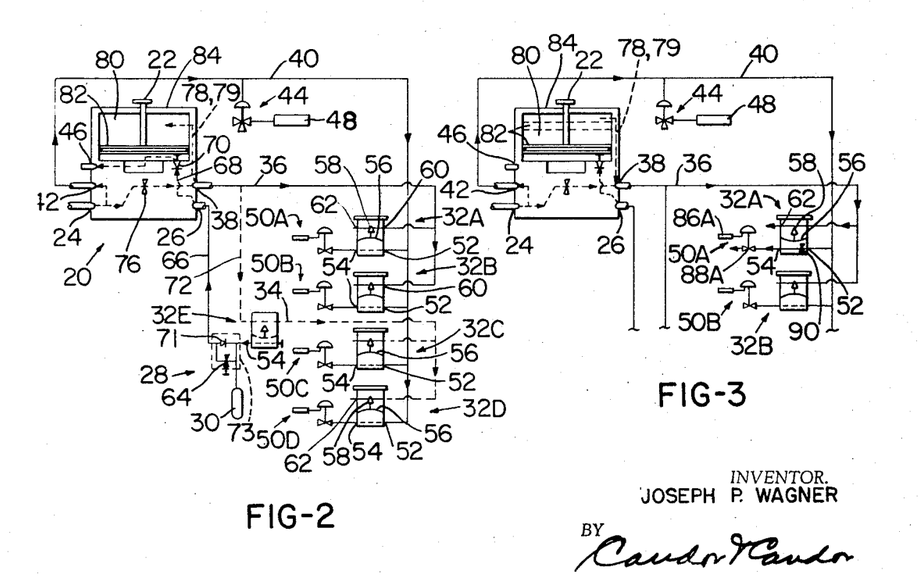
FIGURE 2 shows the system of FIGURE 1 after a short interval of time the system has been started.
FIGURE 3 shows part of the system of FIGURES 1 and 2 with one of the transmitter sensors having sensed an unsafe condition, and causing a shut down of the controlled device.

In FIGURE 2, the actuator or knob 22 has been actuated and pushed down by the operator, or by some mechanism, if desired. This establishes immediate starting conditions for the controlled device 44 under the immediate control of one or more control and indicating units 32A, 32B, etc., and their respective condition sensing transmitters 50A and 50B, etc. It also establishes delayed control of the controlled device 44 by one or more delayed control and indicating units 32C, 32D, etc., and their respective condition sensing transmitters 50C, 50D, etc., as more fully elsewhere explained.

The conditions established in FIGURE 2 also cause the relay 20 to produce an actuated holding action in the relay 20 to hold the actuator or knob 22 in actuated or down position until an unsafe condition, sensed by one of said transmitters causes a shutdown, as shown in FIGURE 3.

The immediate control sensing transmitters 50A and 50B may be responsive to engine excessive temperature and engine excessive speed, for example. The delayed control sensing transmitters 50C and 50D may be responsive to lubricating oil pressures and other conditions which require delayed control.

The immediate starting conditions for the controlled device 44 are established by the construction of the relay 20, which provides connection of the relay controlled pressure supply port 42 with the relay air supply port 24, FIGURE 2, which establishes immediate pressure air supply to the manifold 40. The outlets of the manifold 40 are closed by the safe conditions of the units 32A, 32B. The delayed indicating units 32C and 32D have restrictors 90 at their inlets 52, FIGURE 7, which are connected to manifold 40, so that sufficient operating air pressure is maintained in the manifold 40 by restrictor 90 to open the fuel valve 44.

Figures 5, 8:
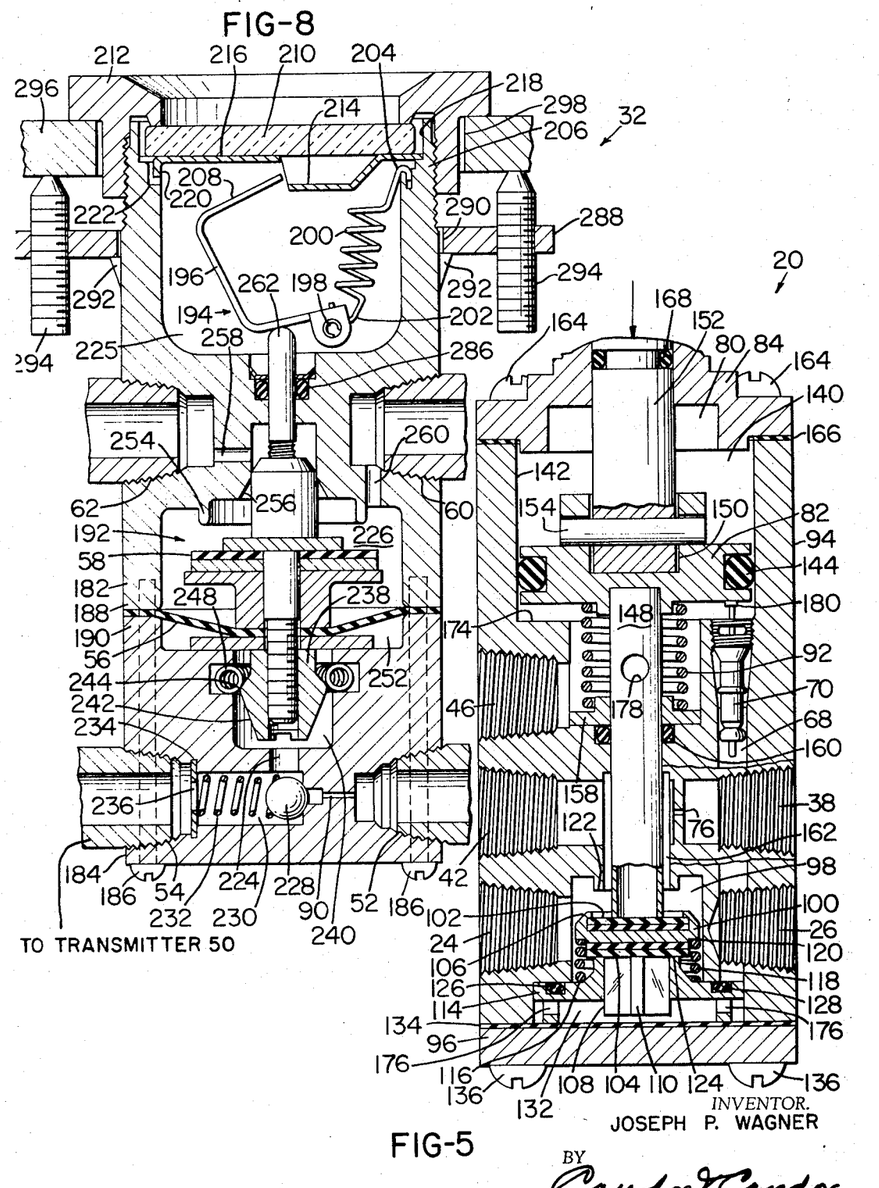
FIGURE 5 is a diagrammatic view of a portion of FIGURE 4, with the parts having been pushed down by manipulation of the knob.
FIGURE 8 is a view similar to FIGURE 7, with the unit having been vented by its transmitter.

The immediate control units 32A and 32B are initially in the condition illustrated for unit 32 in FIGURE 7 with their diaphragms 56 in upper position, or they quickly change to the condition of FIGURE 7 from the condition of FIGURE 8 because their transmitters 50A and 50B sense immediately safe conditions, such as a cool engine and an unstarted engine or slowly moving engine. This becomes apparent in view of further detailed disclosure elsewhere herein provided.

The delayed control units 32C and 32D have transmitters 50C and 50D which, at first, sense conditions which later in the operation of the engine would be unsafe, such as a low lubricating oil pressure, and the like. Therefore, the valves of such transmitters 50C and 50D are initially open and may not be closed quickly enough to prevent engine stoppage before the oil pressure is built up by operation of the engine. In view of this, their manifold 34 has the delayed connection with the manifold connector 37 and manifold 36 produced by delay means 28 as shown by dash lines 72, 34, in FIGURE 2. This delay is sufficient for the oil pressure condition, and any other similar condition, to be made "safe" by a substantial period of operation of the engine, as provided by the delay means 28. This becomes more fully apparent in view of further detailed disclosure elsewhere herein provided.

Therefore, such units 32A–32D, FIGURE 2, are all finally in the condition illustrated for unit 32 in FIGURE 7 with their unit supply ports 52 connected to manifold 40 and with their transmitter ports 54 connected to safe or closed transmitters 50A–50D. When engine operation is completely established, the units 32A–32D are all in the condition shown for unit 32 in FIGURE 7 in which the air pressure built up between the unit ports 52 and 54 cause the unit diaphragm 56 to be in its upper position with the unit poppet valve 58 separating the unit control port 60 from the unit vent port 62, as more fully elsewhere explained.

The delayed control of the controlled device 44 by the units 50C and 50D is established, as shown in FIGURE 2, by the action of the unit 32E in combination with a relatively slow venting of pressure air from the delay means 28 through an adjustable bleed orifice 64 which bleeds the pressure air from capacitor 30 at an adjustable regulated rate through the pipe 66 to the relay port 26, then through a passageway 68 and open check valve 70 in relay 20 to relay vent port 46. This causes the equivalent of a transmitter action on the unit 32E at its transmitter port 54 that causes the unit 32E to to assume a delayed condition as shown in unit 32, FIGURE 8, which lowers the unit 32E poppet valve 58 and connects pipe 72 from immediate control manifold 36 with the delayed control manifold 34. The unit 32E has its "supply" port 52 plugged by a plug 74 to prevent air from entering or leaving through such "supply" port.

The air cannot pass quickly from the capacitor 30 to the relay port 26 because the check valve 71 which is built in the delay valve 73. The air from capacitor 30 must pass through the restrictor 64. However, when the capacitor 30 is to be filled, as in FIGURE 1, air can pass quickly through check valve 71 into the capacitor 30.

The holding action, in FIGURE 2, of the down position of the knob 22 is established by the construction of relay 20 which permits pressure air from relay supply port 24 to pass into cavity 162 and through orifice 76, FIGURE 5, into relay port 38, then through passageways 78, 79, FIGURES 2 and 6, to the space 80 above the piston 82 and below the top wall 84 of the relay 20. The air pressure in space 80 is sufficient to hold the piston 82 and knob 22 in down or actuated position until a transmitter (50A) vents the space 80, as shown in FIGURE 3.

In FIGURE 3, a shutdown is produced in the controlled device 44. The transmitter 50A, of unit 32A, has sensed an unsafe condition by its respective sensor 86A which causes venting at the opened transmitter valve 88A and at unit 32A transmitter port 54. Because of the unit 32A restrictive orifice 90 at unit supply port 52, FIGURES 3, 7 and 8, the venting at transmitter port 54 causes unit diaphragm 56 to move down and open unit poppet valve 58. This fully vents unit ports 60, 62 and control manifold 36. Manifold 36 fully vents relay port 38, passageways 78, 79 and relay space 80. Relay spring 92, FIGURES 4 and 5, pushes relay piston 82 up to FIGURE 1 position, where relay control port 42 vents the manifold 40 into relay vent port 46. This will depressurize manifold 40 and fuel valve 44 and stop engine 48.

Figures 4, 6, 11:
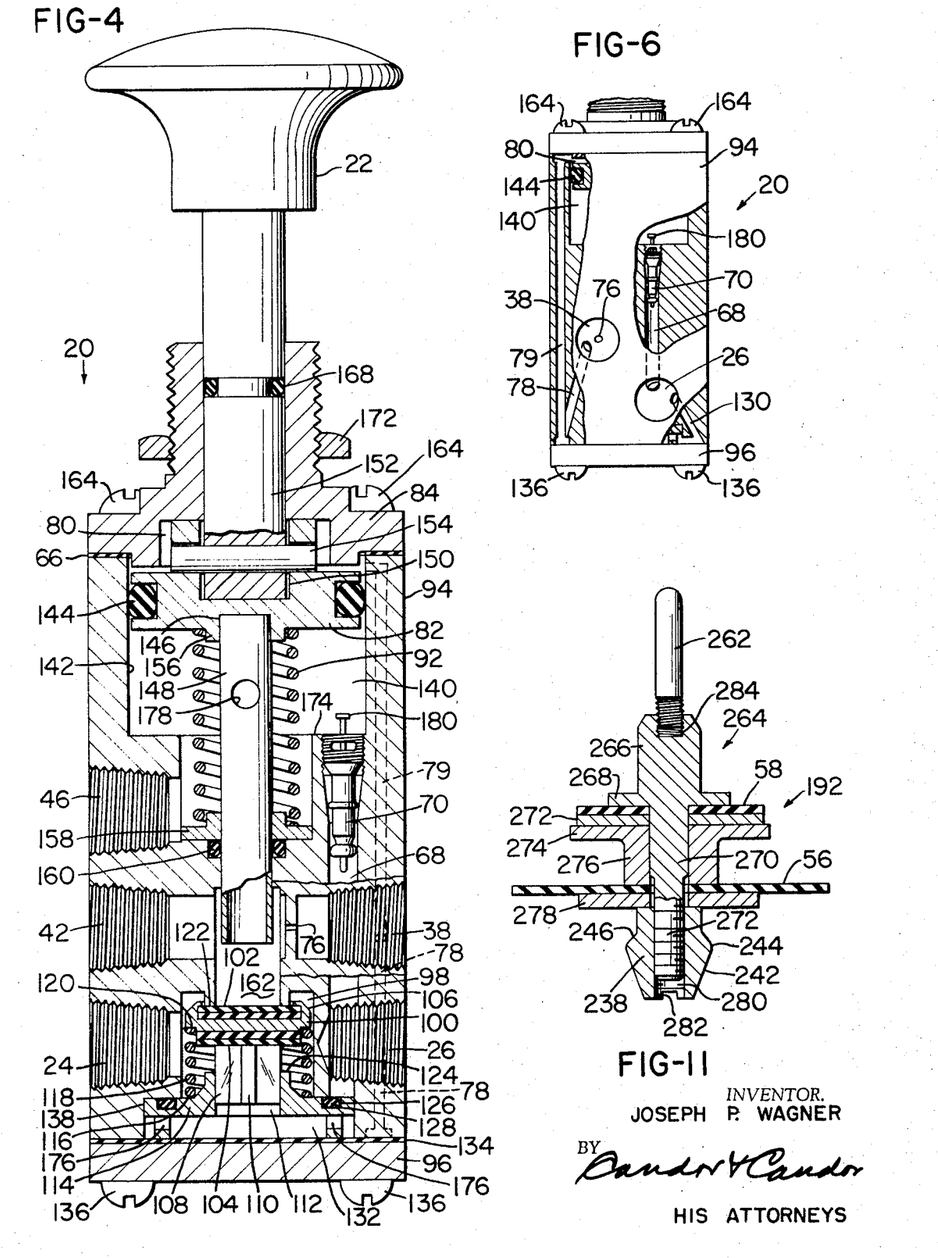
FIGURE 4 is a diagrammatic vertical cross section of the starting relay before its manipulating actuator or knob has been pushed down by the operator.
FIGURE 6 is a reduced scale diagrammatic part cross-section and part elevation of the main body of the relay of FIGURES 4 and 5.
FIGURE 11 is a diagrammatic cross section of the diaphragm stack which is vertically reciprocable in the controlling and indicating unit.

Further details concerning the foregoing preliminary description of the system of FIGURES 1, 2 and 3 will become more fully apparent from the following more detailed description of FIGURES 4, 5 and 6 of the relay 20 and the more detailed description of the controlling and indicating unit 32 of FIGURES 7–10. The more detailed description and FIGURES 7–10 is applicable to each of the units 32A–32E of FIGURES 1, 2 and 3, it being understood that a plug 74 is inserted in unit supply port 52 of unit 32E of FIGURES 1, 2 and 3 instead of the pipe connection illustrated at port 52 for units 32A–32D, as shown in FIGURES 7–10.

Restrictors 90 may be provided at the inlet ports 52 of the indicating units 32A–32E, FIGURES 7 and 8, to maintain sufficient air pressure in manifold 40 to start the engine 48 under the starting conditions of FIGURE 2, as elsewhere more fully described.

Relay 20

The relay 20 of FIGURES 1–6, and particularly of FIGURES 4–6 is as follows.

The relay 20 includes relay casing including a cylindraceous central body 94 and two end caps 84 and 96. The central body 94 is provided with the five previously described relay ports 24, 26, 38, 42 and 46 inwardly directed in said body. The body 94 is made in such a manner as to provide a lower cavity 98 in which the poppet assembly 100 is located. The poppet assembly 100 is made with upper and lower rubber seats 102 and 104. The upper seat 102 is held in place by staking the outer edge 106 of the poppet assembly while the bottom seat 104 is retained by the substantially square shaped poppet extension 108 which has flat corners 110. The extension 108 is closely guided in a circular central hole 112 located in the poppet guide ring 114. Passageways are therefore produced between the square sides of extension 108 and circular hole 112.

The poppet guide ring 114 provides a lower spring seat 116 for poppet return spring 118. The other or upper spring seat 120 is located at the periphery of the poppet assembly 100. Spring 118 urges the assembly 100 toward upper valve seat 122. The top of poppet guide ring 114 forms a lower valve seat 124.

An O-ring groove 126 receives an O-ring 128 which prevents leakage between the cavity 98, passageway 130, FIGURE 6, and cavity 132, FIGURE 4. Gasket 134 forms a seal between central body 94 and lower end cap 96. The cap 96 is held against body 94 by means of a plurality of screws 136, such as four. The screws 136, gasket 134 and cap 96 firmly hold the guide ring 114 in place against the side wall or shoulder 138 of cavity 98.

FIGURES 4 and 5 show the ports 24, 26, 38, 42 and 46 all in the one vertical plane of these figures. However, these ports actually may be in different vertical planes, as indicated in FIGURE 6. This permits the passageways 68, 78, 79, 130, etc., to be also in different vertical planes so that they do not connect ports 26 and 38 for example, and permit passageways 78 and 130, FIGURE 6, to extend downwardly without connecting each other, etc. The passageway 68 can be drilled vertically through port 26 without drilling into port 38, as is obvious.

The upper body cavity 140 in central body 94 provides a cylindrical wall or cylinder 142 in which the piston 82 is closely guided. O-ring 144 forms the seal between piston 82 and cylinder 142.

The bottom side of the piston 82 is provided with a recess 146 in which the tube 148 is firmly fixed. The upper side of the piston 82 is provided with a recess 150 into which the manipulator stem 152 is loosely connected by a roll pin 154. The assembly of piston 82, tube 148 and stem 152 is urged upwardly by the piston return spring 92.

The upper end of spring 92 seats on extension 156 of piston 82, and the lower end of spring 92 seats on washer 158. The washer 158 retains an O-ring 160 which prevents leakage from cavity 162 to upper cavity 140.

End cap 84 is mounted on central body 94 by a plurality of screws 164, such as four, and sealing gasket 166.

Upper end cap 84 is provided with a central bore through which the knob stem 152 is assembled and closely guided. An O-ring 168 prevents leakage from cavity 80. The end cap 84 has an upper reduced diameter and is threaded to receive a panel mounting washer 172.

An offset shoulder 174 is provided in the upper body cavity 140 in which is located an air check valve 70, of the tire inflation type. Valve 70 is threaded into passageway 68 that connects upper body cavity 140 to cavity 132 and port 26 through passageway 130, FIGURE 6, and cross drilled holes 176, FIGURES 4 and 6.

The relatively small orifice 76 is located in the central body 94 at the inner end of port 38 and connects port 38 with cavity 162 and with vent port 42. Port 38 is connected to cavity 80 through passageways 78 and 79, FIGURE 6.

In operation, the normal or starting condition of relay 20 is with the stem 152 and knob 22 in the upward-most position shown in FIGURES 1 and 4. In this position, pressure air is supplied to supply port 24 and is blocked from flowing into cavity 162 by poppet assembly 100 in its upper position of FIGURE 4. However, the pressure air from port 24 is free to flow past valve seat 124 and between circular ring 114 and square cross-sectioned poppet extension 108 to cavity 132. From cavity 132, the air is free to flow through cross drilled holes 176 into passageway 130, FIGURE 6, which is connected to port 26 and passageway 68. Air is prevented from flowing out of passageway 68 by check valve 70 which is in its normally closed position. Some of such air from supply port 24 is discharged in port 26 into pipe 66, past check valve 71 and into capacitor 30 to establish a delay volume of air in capacitor 30. In this position, air is also free to flow or exhaust from port 38 through orifice 76, and with additional air from port 42 can flow into the bottom of hollow tube 148 and out cross drilled hole 178 into the upper cavity 140. Such air is free to exhaust to the atmosphere out of the vent port 46 from cavity 140. This vents manifolds 36 and 40.

To establish the actuated position of FIGURES 2 and 5, a load is applied to the stem assembly through knob 22 which moves certain members downward. The operator holds the knob 22 down for a sufficient time to establish all of the full line circuits shown in FIGURE 2. The units 32A–32D have restrictors 90 at their supply ports 52, so that manifold 40 can be fully pressurized by a large capacity of pressure air from supply port 24 regardless of open or closed transmitter valves, because of the restricting action of restrictors 90. The lower end of tube 148 engages the poppet assembly 100, overcoming poppet return spring 118, as well as stem return spring 92. Sufficient load is applied to knob 22 until poppet assembly 100 engages valve seat 124. In this position, air is free to flow from supply port 24 to cavities 98 and 162 and out control port 42. Air is also free to flow through orifice 76 to port 38 and through passageways 78, 79, FIGURE 6, to cavity 80. With cavity 80 pressurized and cavity 140 vented at port 46, the pressure drop across the piston 82 holds the piston assembly in the down position of FIGURES 2 and 5 provided that port 38 is blocked at all the transmitters 50A–50C, which it is. While in this position, the air check valve 70 is forced open by the bottom of the piston 82 engaging the actuating stem 180 of air check valve 70. This permits air pressure at port 26 to be slowly vented through passageway 68 and out opened air check valve 70, through cavity 140 and out vent port 46. The slow loss of air from capacitor 30 through restrictor 64, pipe 66, port 26, pipe 68 and open check valve 26 will operate unit 32E to connect manifold 34 with manifold 32 after a suitable starting delay.

In FIGURE 3, if the port 38 is opened through one of its connections with the units 32A–32D, such as at unit 32A, FIGURE 3, the holding pressure is lost in cavity 80. Then the pressure drop between the sides of the piston 80 no longer exists. So the piston 82, knob 22, poppet assembly 100, and piston assembly will be returned to their original positions of FIGURES 1 and 4. The pressure in manifold 40 is then vented at 46, FIGURE 1, the fuel valve 44 is closed, and engine 48 is stopped. The indicator 194 of unit 32A will show red while the indicators 194 of units 32B–32D will remain green, as will become apparent from the detailed description of such units.

If desired, the piston assembly can be returned to the original position of FIGURES 1 and 4 and the engine can be stopped by pulling up on knob 22, at any time.

Controlling and indicating units

Each of the controlling and indicating units 32A–32E of FIGURES 1, 2 and 3 may be internally the same as the unit 32 shown in FIGURES 7–10. A description of such unit 32 of FIGURES 7–10 is as follows.

A controlling and indicating unit 32, of FIGURES 7–10, may include an elongated vertical casing having an upper unit main casing body 182 and an attachable lower casing cover 184. The casing may be substantially cylindrical. The body 182 and cover 184 may be secured together by four screws 186, more or less, which extend upwardly through cover 184 and threadedly engage the lower portion of main body 182 in an obvious manner, as shown in dotted lines in FIGURE 8.

The rims 188 and 190 of the body 182 and cover 184 secure and seal the diaphragm 56 within the casing after the diaphragm stack 192 of FIGURE 11 has been inserted in the casing during assembly of the unit 32, as further described.

Proper openings at the perimeter of the diaphragm are provided to allow the screws 186 to pass through the diaphragm and to be sealed against passage of fluid.

The unit 32 is easily and efficiently assembled, with important advantages, because of the cooperation of the main body 182, cover 184 and diaphragm stack 192, as will become more fully apparent.

The assembled, elongated, vertical casing 182, 184 has a unit supply port 52 and a transmitter port 54 at its lower end. It also has a unit control port 60 and a unit vent port 62 at its central zone. It also has an indicating means 194 at its upper end.

The indicating means 194 is movable between a plurality of positions, such as the first and second indicating positions shown respectively in full lines in FIGURES 7 and 8. For example, the indicating means 194 may include an indicating member or lever 196, pivoted about a pivot or fulcrum 198 which may be a roll pin secured to the sides of the casing. The lever 196 may be leftwardly or counterclockwise biased by the tension spring 200 which has one end 202 secured to the indicating member 196 and the other end 204 secured to the upper rim 206 of the casing main body 182.

The upper end or flag 208 of the indicating member or lever 196 may have an indicating symbol or color, such as green, to indicate a first, desirable, or safe condition. This symbol is visible through the sight glass or lens 210 which is secured in the body rim 206 by the internally threaded escutcheon, nut or washer 212 which engages the external threads of the rim 56.

A second symbol or color, such as red, may be provided on the upper surface of a tab, leaf or stationary flag 214 which may indicate a second, undesirable or unsafe condition through the sight glass 210.

The glass 210 may be a disc resting on an untransparent or opaque disc 216 which rests in a recess 218 in the body rim 206. The disc 216 has the leaf 214 formed therein. The disc 216 also has a downward tongue 220 which fits into a slot 222 in the rim 206 to orient the disc 216 when it is being fitted into the recess 218.

When the green flag 208 is in its right or most clockwise position of FIGURE 7, its unit 32 indicates a safe condition. When the flag 208 is in its left or most counterclockwise position of FIGURE 8, the green flag 208 is not visible through glass 210, but the red flag or tab 214 is uncovered and is visible through the sight glass 210 to indicate a second, or undesirable, or unsafe condition.

The assembled casing 182, 184 has an irregular width, vertical casing passageway which extends upwardly from near the bottom or lower end of the casing 182, 184 at and below the lower end connecting means below the throat 224. The passageway extends up through the casing 182, 184 to and above the upper indicating means enclosure 225 at the upper end of passageway of the casing.

The lower end connecting means 224 connects the casing passageway to the supply port 52 and the transmitter port 54. Such casing passageway also forms a central zone connecting means, including upper diaghragm chamber 226 for connecting and disconnecting the control port 60 and the vent port 62. The ports 60 and 62 are connected when the diaphragm 56 is in its lower position, as in FIGURE 8, and are disconnected when the diaphragm 56 is in its upper position, as in FIGURE 7, as is further elsewhere described.

Other parts of the irregular width vertical casing passageway are elsewhere described.

Fluid flow restrictor means 90 and check valve means 228 connect the support port 52 to the lower end of the casing passageway at throat 224. A transmitter port cavity 230 connects the transmitter port 54 to the casing passageway at the throat 224.

The cavity 230 may also contain a relatively weak compression spring 232 which has one end engaging the check valve or ball 228 and its other end engaging a washer 234 which has a fluid flow opening 236 for the flow of pressure air to a transmitter 50A–50D.

A vertically reciprocable snap action detent 238 is located in a snap action detent chamber 240 adjacent the throat 224 and the transmitter port cavity 230. The detent 238 has a relatively gradually contracting lower end 242, a central snap action ridge 244, and a relatively steep contracting upper end 246.

A snap action spring construction 248 engages the snap action detent 238 and causes a relatively gradual upward force in the detent 238 when the spring construction 248 engages the lower end 242. The spring also causes a snap action force when engaging and is being passed by said snap action ridge 244. The spring also causes a relatively intense downward force in said detent when engaging the detent upper end 246. The spring construction 248 and the detent 238, because of the foregoing forces, cause an inverse resistance to movement of said detent by said diaphragm 56 as elsewhere described.

The spring 248 may be an annular, contractable spring located in spring cavity 250 which holds the spring against longitudinal movement. Air can pass freely through the spring from trough 224 to lower diaphragm chamber 252 and vice versa.

A diaphragm construction or stack 192, FIGURE 11, is connected with the upper end of the snap action detent 238. Such diaphragm stack 192 includes the diaphragm 56 which seals and separates a central enlargement in the casing passageway into a lower diaphragm chamber 252, and an upper diaphragm chamber 226.

A valve seat 254, which may be circular, is provided at the upper end of the upper diaphragm chamber 226. The valve seat 254 has an inner flow connection 256, 258 to the vent port 62 and has an outer flow connection 260 to the control port 60. The valve seat 254 separates or controls the flow of air from the control port 60 to the vent port 62.

A poppet valve means 58 is connected to the diaphragm 56 and is movable by such diaphragm 56 to close the valve seat 254 to disconnect the control port 60 from the vent port 62. The valve means 58 is movable downwardly to open the valve seat 254 to connect the control port 60 and the vent port 62.

Plunger means 262 is connected to and is movable by the poppet valve means 58 to move the indicator means 194 between first and second indicating positions, as shown respectively in full lines in FIGURES 7 and 8. Such plunger means moves the indicating means 194 as the valve means 58 opens and closes the valve seat 254.

The diaphragm stack 192 of FIGURE 11 may be assembled as a unit to be inserted upwardly into the casing body 182. The casing parts 182 and 184 may then be secured together by four screws 186, more or less, which extend upwardly through the casing at places that do not interfere with the ports. The perimeter of the diaphragm is secured and sealed between the rims 188 and 190 during this assembly.

The valve stack 192 of FIGURE 11 includes an integral poppet retainer body 264, including a cylindrical upper portion 266, a hex-shaped disc 268, a lower pin 270, which has a lower threaded portion 272. The plunger 262 may be adjustably threaded into the cylindrical upper portion 266. Such plunger 262 can be vertically adjusted to obtain the desired movement of the indicating means 194.

The resilient disc-like poppet valve means 58 may be a disc made of any suitable well known sealing material, such as a well known rubber backed synthane which has a hole at the center through which the pin 270 can pass, so that the disc 268 may bear against the disc 58. A poppet valve support is provided in the shape of a disc 272, to which the disc 58 can be adhered, and another disc 274, with a downward sleeve 276. A diaphragm shoe or disc 278 is placed under the diaphragm 56. Then the members between the discs 268 and disc 278 are tightened together by upwardly threading the snap action detent 238 on the threaded portion 272 of the pin 270. The lowest internally threaded portion 280 of the detent 238 extends down below the threaded portion 272, and is provided with a screwdriver slot 282, so that the detent 238 and the hex disc 268 can be relatively turned to tighten the detent 238 against the disc 278, to provide a tight stacked construction. The plunger or plunger means 262 is threaded into a threaded opening 284 in the cylindrical portion 266 of the valve retainer. The plunger 262 may be calibrated by turning the same within the threaded opening 284. An O-ring 286 prevents air leakage about the plunger 262.

A mounting ring 288 is assembled past the threaded rim 206 and has a center hole 290 sufficiently large to fit over the threaded rim 206 and to bear against projections 292 on the outside of the body 182. The ring 288 is free to rotate to any desired position to make accessible two jack screws 294 for mounting of the unit 32 on a panel 296, which has an opening 298 to receive the escutcheon 62. When the ends of the jack screws 294 are tightened against the panel 296, the unit 32 is firmly mounted in the panel 296.

In operation of the unit 32, air is supplied to the supply port 52, then through restrictor orifice 90 and past the free flow direction of the check valve 228. If the associated transmitter which is connected to the transmitter port 54 is safe or in desirable condition, with its valve closed, pressure air will build up into the lower diaphragm chamber 252 through throat 224, detent chamber 240, and annular coil spring 248.

The poppet valve 58 is forced against the poppet valve seat 254 and prevents pressure air, which is admitted to the control port 60, from venting out into the vent port 62. As super amospheric air pressure builds up in the upper diaphragm cavity 226 from control port 60 through passageway 260, the pressure unbalance of the vented air inside valve seat 254 holds the poppet valve 58 closed against the seat 254 even though the original pressure effect to close the valve in the lower diaphragm cavity 252 is cancelled or vented. In this position the plunger 262 holds the indicator flag 208 in the slotted recess in its right or most clockwise position, to indicate green, as shown in FIGURE 7.

If the transmitter connected to the transmitter port 54 becomes unsafe, and its valve is opened, air pressure is reduced in the transmitter cavity 230 and up through to the lower diaphragm chamber 252. This causes a super atmospheric and near atmospheric pressure differential between the diaphragm cavities 252 and 226. When the pressure differential across the diaphragm 56 is great enough to overcome the pressure effect on the unbalanced area of the valve seat 254 on the poppet valve 58, the diaphragm stack 192 is urged downwardly.

As the stack 192 begins to move downwardly from the seat 254, the inwardly biased spring 248 resists this movement until the ridge 244 passes the center of the spring 248. Since the diameter of the detent 238 is then sharply reduced at the surface 246, the resistance exerted by the spring 248 is greatly reduced. The differential pressure across the diaphragm 56 is then sufficient to snap the stack 192 to its bottommost condition, as shown in FIGURE 8. The spring 248 will continue to hold the stack in this position. With the stack in its bottommost position, plunger 262 is retracted and spring 200 biases the indicating flag 208 to its left position, as shown in FIGURE 8 thus exposing the red surface of the tab 214 in the window or glass 210. In this position, air is free to flow from the control port 60 through the passageways 260 and 258 into the vent port 62.

The passageway 258 is so located relative to the upper end of the cylindrical portion 266 that air flow is restricted until the stack 192 moves sufficiently to snap detent 238 through the spring 248. This is to prevent false signaling under extreme conditions when poppet 58 moves away from the seat 254 just enough to vent the control port without forcing the detent 238 through the spring 248. Also, the stem or plunger 262 can be adjusted to compensate for manufacturing tolerances by means of the threaded connection to the cylindrical portion 266 to position to the flag 208 so that a full red signal is displayed in the full counterclockwise position, and a full green indication in its full clockwise position.

With the stack 192 in its lower position, air can be supplied to the supply port 52 and with a safe transmitter having its valve closed, or with the port 54 blocked, a pressure builds up in lower diaphragm cavity 252 sufficiently to snap detent 238 through the garter spring 248, closing valve 58, and the green portion of flag 208 entering above the tab 214.

It is preferred that the profile of detent 238, the size and weight of the garter spring 248, are such that, in combination with the effective area of diaphragm 56, this action occurs within a specific pressure band. To prevent false signaling and/or fluttering, it is desirable that the differential pressure effect between the diaphragm cavity 252 and the cavity 226 be such that the pressure at transmitter port 54 be always higher to give a green signal than the pressure required to give a red signal.

Therefore, the effective area of diaphragm 56 with the higher pressure in cavity 252 (to give a green signal) is much less than the effective area with the higher pressure in cavity 226 (to give a red signal). Also, the ramp profile 246 of detent 238 is much steeper and offers more resistance to movement of the stack in one direction than the gradual slope 242 of the detent 238 in the other direction. As an example, with 20 p.s.i. supplied to the supply port 52, the indicator 194 can reset to give a green signal between 14 and 18 p.s.i. at the transmitter port 54. The pressure can then drop to between 13 and 8 p.s.i. at port 54 for the indicator 194 to trip and give a red signal.

As the unit 32 is one of a group in the system, as described above, and it is associated with a transmitter that remains safe with its valve closed, while another unit has its transmitter valve open because of an unsafe condition, the safe unit indicator will remain green even if the system pressure is lost, due to the holding action of the detent 238. In the same manner, it will retain a red signal. It is preferred, however, that in reaching a green signal with the system pressure lost, that the pressure in cavity 252 be retained by check valve 228 until the pressure in cavity 226 is lost. This is done with check valve 228 preventing a sudden rush of air out of the orifice 90 and into the supply port 52.

*Brief description of operation*

In FIGURE 1, the relay knob 22 is in its upper position, and large capacity pressure air has been supplied at supply port 24 for some time. Air has passed to port 26, pipe 66, through check valve 71, filled capacitor 30 and the lower diaphragm cavity of unit 32E to close its poppet valve. The manifolds 36 and 40 have been vented at vent port 46.

In FIGURE 2, the operator has pushed the knob 22 down and has connected supply port 24 with manifold 40. The manifold 40 is pressurized because its terminal connections at unit supply ports 52 all have restrictors 90 (FIGS. 3, 7, 8) which provide sufficient restriction to insure pressurization of manifold 40. The fuel valve 44 is therefore opened and the engine 48 can be started.

Pressure air from port 24 also flows to immediate manifold 36 and into holding space 80. The piston 82 is therefore held down after the knob 22 is released by the operator. However, the operator holds the knob down for a sufficient length of time to insure pressurizing of manifolds 36 and 40. If any one of the units 32A, 32B that are connected to the immediate manifold 36 senses an unsafe condition, it will vent manifold 36 and stop operation upon release of the knob 22 by the operator.

However, if such unsafe condition has been made safe, the units 32A and 32B will quickly have their diaphragms moved upwardly, if necessary, and the engine will continue to operate.

The units 50C and 50D cannot stop starting operations, since their delay manifold 34 will not be connected to the manifold 36 until after a predetermined starting period established by the delay means 28. For this delay, the pressure air in the capacitor or tank 30 must first be slowly discharged past the restrictor 64, up pipe 66 through port 26, pipe 68, open check valve 70 and out vent port 46. When capacitor 30 is sufficiently vented, the unit 32E also will be vented at 54 to lower its diaphragm and poppet valve and to open the connection between manifolds 36 and 32. The delay manifold 34 therefore will not be made effective to stop operation of the engine until after the engine 48 has operated long enough to raise the lubricant pressure sufficiently to impart a safe sensing action to its transmitter 50C, for example, to close its valve. The same action applies to any other similar condition which might be effective on transmitter 50D, etc.

In FIGURE 3, the units 32A and 32B can immediately stop the engine if they sense their respective condition as unsafe. Also the units 32C and 32E can similarly stop the engine after the delay period of FIGURE 2 has expired and their control manifold 34 has been connected to manifold 36.

As shown in FIGURE 3, the transmitter 50A will stop the engine 48. The valve 88A is opened by the unsafe condition sensed by sensor 86A. This vents the lower diaphragm chamber and causes diaphragm 56 to pull down poppet valve 58. This causes vent port 62 to vent manifold 36, passageways 78, 79 and holding space 80. The relay spring 92 then pushes up the piston 82 and produces the conditions of FIGURE 1. The conditions of FIGURE 1 will vent the manifold 40 into vent port 46 which will close fuel valve 44 and stop engine 48.

The indicator 194 of the unit 32A will have been moved counterclockwise to the position shown in FIGURE 8 to display a red signal from red tab 214.

The other units will remain with their indicators 194 in the green indication position of FIGURE 7, because of the action of their detents 238 which will hold their diaphragm 56 in the up position in the absence of any high pressure differentials between their diaphragm chambers 226 and 252. There is no material pressure differential in these chambers since all the manifolds 34, 36 and 40 have been vented to substantially equal pressure.

The operator therefore will be advised that the condition sensed by unit 32A should be corrected before attempting to restart the engine.

Applicant's system of FIGURES 1, 2 and 3 is very simple, economical and effective. The relay 20, the delay means 28, and the units 32A–32E are likewise simple, economical and effective.

While the form of the invention now preferred has been disclosed as required by statute, other forms may be used, all coming within the scope of the claimed subject matter which follows.

What is claimed is:

1. A control system comprising: a safety relay having a relay pressure supply port, a relay vent port, a relay controlled pressure supply port, a relay delay pressure supply port, a relay holding pressure port, a relay actuator, and a holding pressure responsive member; a plurality of controlling and indicating units; an immediate control manifold connected to said relay holding pressure port, to said relay controlled pressure supply port by a restricting means and connected to one or more of said indicating units; a delayed control manifold also connected to said relay holding pressure port, to said relay controlled pressure supply port by said restricting means and connected to one or more of said indicating units; a controlled pressure supply manifold connected to said relay controlled pressure supply port and to said one or more indicating units which are connected to said immediate control manifold and to said delayed control manifold; a pressure controlled device connected to said pressure supply manifold; and delay means to provide a delayed connection between said delayed control manifold and said safety relay.

2. A control system according to claim 1 in which each of said controlling and indicating units comprises, a unit elongated casing having a unit supply port and a unit transmitter port at its lower end, a unit control port and a unit vent port at its central zone and an indicating means at its upper end movable between first and second indicating positions, said unit casing having an irregular width vertical casing passageway with lower end connecting means connecting said passageway to said unit supply port and said unit transmitter port, central zone connecting means connecting said passageway to said unit control port and said unit vent port, said passageway having an indicating means enclosure at its upper end, flow restrictor means and check valve means at said lower end connecting means connecting said unit supply port to the lower end of said casing passageway, a transmitter port cavity in said lower end connecting means connecting said unit transmitter port to the lower end of said casing passageway, a vertically reciprocable snap action detent located in a snap action detent chamber formed in said casing passageway adjacent said transmitter port cavity, said detent having a contracting lower end, a central snap action ridge and a contracting upper end, snap action spring means engaging said snap action detent and causing an upward force in said detent when engaging said detent lower end, a snap action force when engaging and passing said snap action ridge, and a downward force in said detent when engaging said detent upper end, a diaphragm construction secured by said upper end of said snap action detent, said diaphragm construction sealing and separating a central enlargement in said unit casing passageway into a lower diaphragm chamber and an upper diaphragm chamber, a poppet valve seat at the upper end of said upper diaphragm chamber with an inner flow connection to said unit vent port and outer flow connection to said unit control port, a poppet valve means connected to said diaphragm and movable by said diaphragm to close said valve seat to disconnect said unit control port from said unit vent port, said valve means being movable to open said valve seat to connect said unit control port and said unit vent port, plunger means connected to and movable by said poppet valve means and actuating said indicator means to move said indicator means between said first and second indicating positions as said valve means opens and closes said valve seat.

3. A system according to claim 2 in which said unit casing comprises an upper main casing body and a lower casing cover, said body and cover having mating rims surrounding said central passageway enlargement, said rims securing and sealing a perimeter of a diaphragm of said diaphragm construction, said diaphragm separating said enlargement into said upper and lower diaphragm chambers.

4. A system according to claim 3 in which a unitary diaphragm stack is vertically movable in said passageway and has a vertically adjustable plunger of said plunger means at the upper end of said stack, said poppet valve means adjacent said plunger, a diaphragm adjacent said poppet valve means, and said detent adjacent said diaphragm and at the bottom of said stack.

5. A system according to claim 2 with one or more of said units having their supply ports connected to said immediate control manifold and their control ports connected to said pressure supply manifold, and with one or more of said units having their supply ports connected to said delayed control manifold, and with said units having their transmitter ports connected to respective transmitter valves of transmitters having condition sensors closing said respective transmitter valves when said respective sensors sense a desired condition, and opening said respective transmitter valves when said sensors sense an undesired condition.

6. A system according to claim 5 in which said pressure controlled device includes an engine with a power supply controlled by said pressure supply manifold, and said transmitter sensors sense respectively safe and unsafe conditions, said pressure supply manifold causing said engine power to be supplied when all of said sensors sense safe conditions and causing said engine power supply to be stopped when one of said sensors senses an unsafe condition, said one or more of said units which are connected to said delayed condition manifold sensing engine conditions which become safe only after said engine has attained a full starting condition.

7. A system according to claim 6 in which said respective detent means hold said respective indicating means in their initial positions after said one of said sensors senses an unsafe condition even after said compressed air supply is stopped to said supply ports.

8. A system according to claim 2, in which said detent has a relatively gradually contracting lower end, a central snap action ridge and a relatively steep contracting upper end, and in which said snap action spring means causes a relatively gradual upward force in said detent when engaging said detent lower end, a snap action when engaging and passing said snap action ridge, and a relatively intense downward force in said detent when engaging said detent upper end.

9. A control system according to claim 1 in which each of said controlling and indicating units comprises, a casing with a diaphragm in an intermediate zone of said casing, said casing having a lower diaphragm chamber below said diaphragm and an upper diaphragm chamber above said diaphragm, said casing having a unit supply port and a transmitter port below said diaphragm with lower connecting means connecting said unit supply port and said transmitter port to said lower diaphragm chamber, said casing having a unit control port and a unit vent port above said diaphragm with upper connecting means connecting said unit control port and said unit vent port to said upper diaphragm chamber, a restrictor and a check valve between said unit supply port and said lower diaphragm chamber, a poppet valve seat in said upper diaphragm chamber with vent passageway means connecting the interior of said poppet valve seat with said unit vent port, said poppet valve seat having control passageway means connecting the exterior of said poppet valve seat with said unit control port, a diaphragm stack vertically movable in said casing and having a vertically movable plunger at the upper end of said stack, a poppet valve means closing and opening said poppet valve seat, means on said stack holding said diaphragm adjacent said poppet valve means, and a snap action detent means at the lower end of sid stack adjacent said diaphragm, said detent means having a contracting lower end, a central snap action ridge, and a contracting upper end, a snap action spring means engaging said snap action detent means and causing an upward force in said stack when engaging said detent means lower end to close said poppet valve seat, a snap action force when engaging and passing said central snap action ridge, and a downward force in said stack when engaging said detent upper end to open said poppet valve seat, an indicating means at the upper end of said casing movable between first and second indicating positions by said plunger when said stack is respectively in its upper and lower positions.

10. A control system according to claim 1 in which a plurality of said indicating units each has a unit vent port, a unit control port connected to one of said manifolds, a unit supply port connected to said controlled pressure supply manifold, and a unit transmitter port; a plurality of condition sensing transmitters each being respectively connected to one of said transmitter ports.

11. A control system according to claim 10 in which another of said indicator units has a unit vent port connected to said relay holding pressure port, a unit control port connected to said delayed control manifold, a closed unit supply port, and a unit transmitter port connected to a delay pressure capacitor and to said relay delay port in said safety relay.

12. A control system according to claim 11 in which said delay pressure capacitor is a pressure tank, said tank being connected to said last named transmitter port, to a time limit valve and to said relay delay port in said safety relay, said relay delay port being connected to said relay vent port when said relay is actuated, and to said relay supply port when said relay is not actuated.

13. A control system according to claim 11 in which all of said indicator units are substantially internally identical.

14. A control system according to claim 1 in which said safety relay comprises: a relay casing including a cylindraceous central body with closed ends with said relay pressure supply port, said relay vent port, said relay controlled pressure supply port, said delay pressure supply port and said relay holding pressure port inwardly directed into said cylindraceous central body; valve means and passageway means in said casing to connect said delay pressure supply port to said relay vent port; said casing providing a lower cavity, an upper cavity and an intermediate cavity; a poppet means and poppet seat means in said lower cavity, said poppet means being movable to an upper position to connect said relay pressure supply port to said delay pressure supply port and to disconnect said relay pressure supply port from said holding pressure port and said relay vent port; actuator means, tube means, and piston means connected together and downwardly movable to move said poppet means downwardly to connect said relay pressure supply port directly to said relay controlled pressure supply port and through orifice means to said holding pressure port to supply pressure air immediately to said immediate control manifold and to pressurize a holding space in said upper cavity above said piston means to hold said actuator means and piston means in actuated position and to open said valve means and said passageway means in said casing to connect said delay pressure supply port to said relay vent port to provide a delayed connection between holding pressure port and said delayed control manifold; and relay spring means to return said actuating means, tube means and poppet means to upper position when one of said indicating units vents one of said manifolds to release pressure air from said holding space above said piston means and to cause said pressure supply manifold to be vented to said relay vent port to stop said pressure controlled device.

15. A safety relay comprising: a relay casing including a cylindraceous central body with closed ends; said body having a relay pressure supply port to be connected to a pressure supply, a relay vent port to be connected to the atmosphere, a relay controlled pressure supply port to be connected to a controlled pressure supply manifold that is connected to a controlled device and to a plurality of controlling and indicating units, a delay pressure supply port to be connected to a delay means, a relay holding pressure port to be connected to an immediate control manifold and to a delay control manifold, said ports being directed into said cylindraceous central body; valve means and passageway means in said casing to connect said delay pressure supply port to said relay vent port; said casing providing a lower cavity, an upper cavity and an intermediate cavity; a poppet means and a poppet seat means in said lower cavity, said poppet means being movable to an upper position to connect said relay pressure supply port to said delay pressure supply port and to disconnect said relay pressure supply port from said holding pressure port and said relay vent port; actuator means, tube means, and piston means connected together and downwardly movable to move said poppet means downwardly to connect said relay pressure supply port directly to said relay controlled pressure supply port and through orifice means to said holding pressure port to supply pressure air immediately to said immediate control manifold and to pressurize a holding space in said upper cavity above said piston means to hold said actuator means and said piston means in actuated position and to open said valve means and said passageway means in said casing to connect said delay pressure supply port to said relay vent port to provide a delayed connection between said holding pressure port and said delayed control manifold; and relay spring means to return said actuating means, tube means and poppet means to upper position when one of a plurality of indicating units vents one of said manifolds to release pressure air from said holding space above said piston.

16. A safety relay according to claim 15 in which said piston means is slidably sealed in said upper cavity, and said tube means is slidably sealed between said upper cavity and said intermediate cavity and has an opening in said upper cavity and has a lower end that is spaced from said poppet means when in upper position and is sealed to said poppet means in lower position.

17. A safety relay according to claim 16 in which said poppet means has upper and lower poppet surfaces, said upper poppet surface engaging an upper poppet seat connecting said intermediate cavity and said lower cavity, and said lower poppet surface engaging a lower poppet seat connecting said lower cavity and a passageway to said delay pressure supply port.

18. A safety relay according to claim 17 in which said upper cavity is connected to said relay vent port, said intermediate cavity is connected to said relay controlled pressure supply port, and through said orifice to said relay holding pressure port, and said lower cavity is connected to said delay pressure supply port.

19. A safety relay according to claim 18 in which said delay pressure supply port is connected to a passageway connected to said upper cavity, said passageway having a normally closed check valve adjacent said upper cavity, said check valve being opened by said piston means when said piston means is in its lower position.

20. A safety relay according to claim 19 in which said relay holding pressure port is connected to a passageway that is connected to said holding space in said upper cavity above said piston in its upper position.

21. A safety relay according to claim 20 in which a poppet guide ring is provided at the bottom of said lower cavity, said guide ring having a circular opening forming said lower poppet seat at its upper end, said poppet means having a non-circular poppet extension in said circular opening.

References Cited

UNITED STATES PATENTS

| | | | |
|---|---|---|---|
| 3,189,047 | 6/1965 | Puster | 137—26 X |
| 3,216,409 | 11/1965 | Puster | 137—26 X |
| 3,254,670 | 6/1966 | Puster | 137—557 |

NATHAN L. MINTZ, *Primary Examiner.*